Patented Aug. 19, 1941

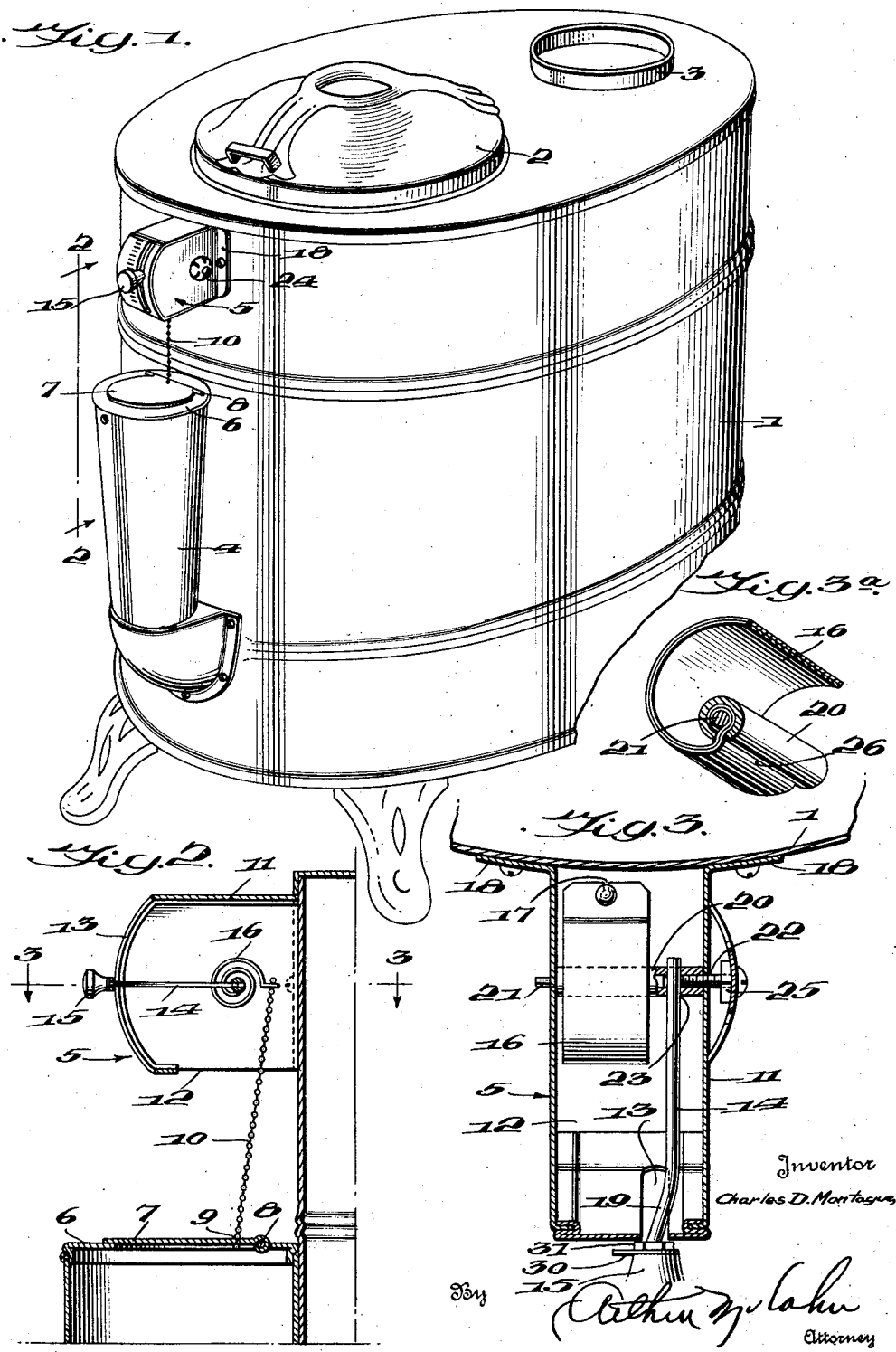

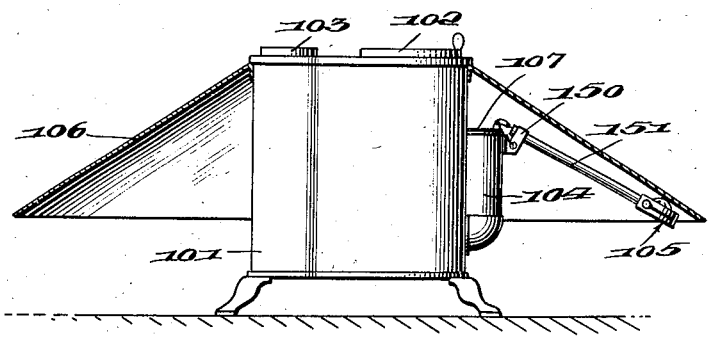
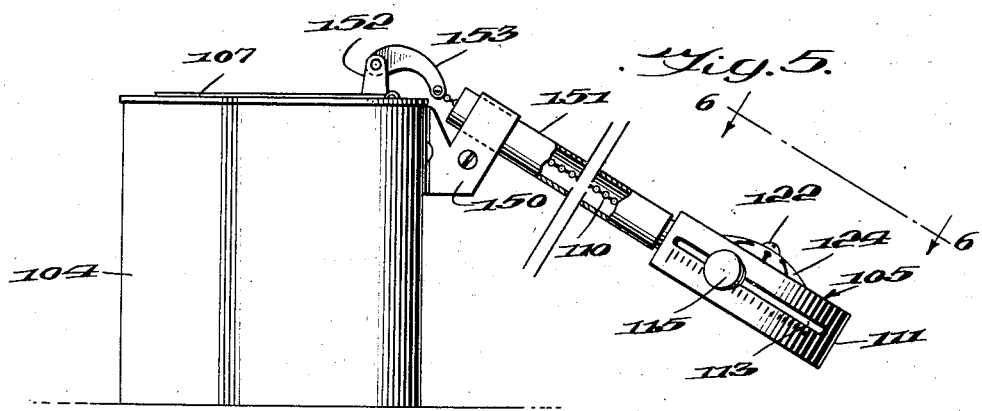
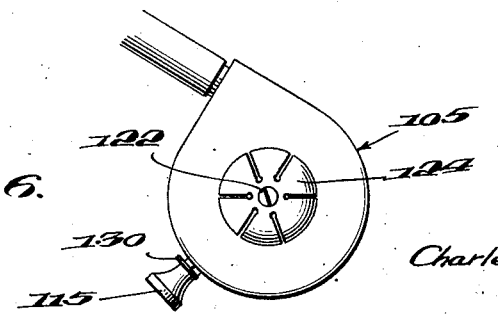

2,253,442

UNITED STATES PATENT OFFICE 2,253,442

THERMOSTATIC CONTROL

Charles D. Montague, Fredericksburg, Va.

Application August 15, 1938, Serial No. 225,036

4 Claims. (Cl. 236—96)

This invention relates to thermostatic draft controls, such as are applied particularly to automatically control and regulate the position of the draft damper of a wood burning furnace thereby to control the heat of the furnace.

An object of my invention is to provide a mechanical connection between the thermostat and the damper which will cause the damper to assume an opened, closed, or some intermediate position in response to the actuation of the thermostat by the heat of the furnace and as set for a predetermined heating condition. The damper will automatically regulate the heat of the furnace to maintain heating conditions as constant as practicable.

A further object of my invention is to construct a thermostatic control mechanism of few parts, which are readily assembled in a working arrangement. Simplicity of arrangement of the mechanism tends for a more accurate and sensitive control of the draft damper in response to variant heating conditions.

Regulation by means of my thermostatic draft control is also applicable to a poultry brooder of the wood burning type, as illustrated in the accompanying drawings and to be described in the following specification.

With the above and other objects in view, the invention further consists of the following novel features and details of construction, to be hereinafter described, illustrated in the accompanying drawings, and set forth in the appended claims.

In the accompanying drawings:

Figure 1 is a view in perspective showing my thermostatic draft control mechanism applied to a domestic wood-burning heater;

Figure 2 is a sectional view taken through the control mechanism and the damper along the plane 2—2 of Figure 1;

Figure 3 is an enlarged sectional fragmentary detail view of the thermostat device taken through the plane 3—3 of Figure 2;

Figure 3ª is a perspective fragmentary view of the bi-metallic coil on its shaft;

Figure 4 is a side elevation of a poultry brooder showing the invention as applied thereto;

Figure 5 is an enlarged view in elevation showing the invention in greater detail as applied to the draft stack of the poultry brooder; and Figure 6 is a plan view of the thermostat device taken in the direction of arrows 6—6 in Figure 5.

Referring to Figure 1, a conventional domestic wood burning furnace is shown, consisting of an outer envelope 1, a fuel door 2, a smoke outlet 3, and a draft stack 4. My invention as used with this type of burner is shown applied to the draft stack 4.

With special reference to the showing of Figures 2 and 3, it will be seen that my thermostat, indicated generally by reference character 5, is operatively associated with the draft damper 7 of the draft stack 4. The draft damper 7 is pivotally connected to the stack 4 by a hinge 8. A flexible chain 10 is connected to the damper 7 in close proximity to the hinge 8. The draft damper due to its gravital effect is normally in closed position as illustrated in Figure 2.

The thermostat control, which comprises part of my invention, is enclosed in a housing 11. The housing 11 terminates in a pair of outwardly extending flanges 18, which are connected by bolts to the envelope 1 of the furnace. The housing 11 is open at its bottom portion, as indicated by the reference character 12, so that the heat radiated by the furnace 1 can readily enter into the housing 11 to act upon the thermostat enclosed therein. The housing 11 is also slotted at 13 to receive a regulating lever 14, which is projected from the interior of the housing 11 through the slot 13. The outer end of the lever 14 has a knob 15 attached thereto. A pointer 30 is affixed to the inner portion of the knob by means of a nut 31. The pointer 30 is moved by the knob 15 with reference to indicia (Figure 1) marked upon the outer surface of the housing 11 to enable setting the control mechanism for automatically regulating the heat of the furnace in accordance with desired conditions.

The thermostat comprises a bi-metallic coil 16, of which a portion is shown in Figure 3ª to more clearly illustrate the laminations of the coil. It is obvious, of course, that any conventional type of heat responsive coil can be used.

The shape of the coil approximates an involute, the inner end being affixed to a hollow shaft 20. One end of the hollow shaft 20 contains a bearing pin 21, which is frictionally held in engagement therewith by the end of the coil 16. The coil 16 is anchored between the outer surface of the pin 21 and the interior surface of the hollow shaft 20. The shaft 20 is slotted at 26 to receive the end of the coil 16, which is partially wound about the pin 21 and thus held anchored.

The opposite end of the hollow shaft 20 has an internal thread to receive the stem of a threaded bolt 22. A semi-spherical washer 24, radially slitted, is attached to the head of the bolt 22 by a nut 25. The edge of the washer 24 bears against the side of the housing 11 to frictionally maintain the setting of the bi-metallic coil 16 in any selected position.

It will be seen that the outer end of the bi-metallic coil 16 is slotted at 17 to receive an end of the operating chain 10.

An operating lever 14 is connected to the hollow shaft 20, to which the bi-metallic coil 16 is attached. As shown in Figure 3, the hollow shaft 20 is apertured at 23 to receive the end of the lever 14. The end of the bolt 22 acts as a set screw to fix the lever 14 with respect to the shaft 20. It will be evident that the bolt 22 has the secondary function of retaining the semi-spherical washer 24 in frictional engagement with the outer surface of the housing 11. Rotation of the hollow shaft 20 by means of the lever 14 will rock the bi-metallic coil 16 to vary the elevation of its free end which is connected to the chain 10. The outer end of the lever 14 is offset at 19, so that the projecting portion of the lever may extend through the slot 13.

In the operation of the mechanism it will be evident that if it is desired to increase the heat of the furnace, the operating lever 14 is swung downwardly from the position of Figure 2. This will rotate the hollow shaft 20 in a counter-clockwise direction lifting the outer end of the bi-metallic coil 16 and the chain 10 attached thereto. Lifting of the chain 10 will effect a swinging of the draft damper 7 to an open position about its hinge 8. The open draft damper 7 will increase the intensity of the fire in the furnace 1. As the furnace gives off its increased heat, the bi-metallic coil 16 responds to the changed thermal condition of the air within the housing 11 and effects a lowering of the outer end of the bi-metallic coil and a consequent closing of the damper 7. The opening and closing of the damper 7 may occur in a series of steps depending upon the sensitivity of the heat responsive coil 16 which is employed.

In Figures 4, 5 and 6 my invention is illustrated as used in conjunction with a poultry brooder of the wood burning type. The brooder is of the conventional form including an outer casing 101, a fuel door 102, a smoke outlet 103, a draft stack 104, and a canopy 106.

The thermostat control mechanism is operatively associated with the pivoted draft damper 107. The thermostat device used with the brooder is of similar construction as that used with the wood burning furnace as heretofore described. Similar parts of the thermostat mechanism are indicated by the same reference characters in the class of numerals above 100. Thus the thermostat indicated generally by reference character 5 in the wood burning furnace of Figure 1, is indicated by the reference character 105, in the poultry brooder of Figure 4.

Also shown associated with the control mechanism of the poultry brooder are the knob 115 and pointer 130 of the thermostat operating control lever. The slot 113, bolt 122 and washer 124 perform their similar functions as in the embodiment heretofore described.

A bracket 150 is attached to and extends from the upper portion of the outer surface of the draft stack 104. The bracket 150 supports an extended tube 151, which has attached to its lower end the housing of the thermostat device 105.

The draft damper 107 has an attached finger 152 projected from the outer surface thereof for actuation of the draft damper 107 about its pivotal hinge. A link 153 connects the finger 152 with the actuating chain 110. As shown, the chain 110 is housed within the tube 151. The chain has connection with the thermostat bi-metallic coil, which it is understood is housed within the casing 111.

The operating of the control device 105 is the same as the operation of the control device 5 heretofore described. The opening and closing of the draft damper 107 responds to the varying thermal effects upon the control mechanism 105.

The inclination and length of the supporting tube 151 is such that the control device 105 will be positioned a sufficient height above the floor level to be beyond the zone of interference by the chicks beneath the canopy 106.

It will be evident that my invention can readily be adapted by one skilled in the art to various modifications and uses in the art to which it pertains.

Having described the invention I claim:

1. A thermostatic damper control comprising a casing structure, a hollow shaft rotatable therein, a pin frictionally engaged in one end of said shaft and having a projecting portion journaled in the casing, a thermostatic coil having its inner end affixed to the hollow shaft by means of said pin, its outer end being freely suspended in the casing and adapted for connection with the damper, a bolt in the opposite end of said hollow shaft forming a journal in the casing, a washer attached to said bolt and in frictional engagement with the casing to maintain the free end of the thermostatic coil in a selected position, and an operating lever attached to said shaft and projecting through the casing, whereby through manipulation of said lever the positional relationship of the free end of the coil may be varied to accord with said selected position.

2. A thermostatic damper control comprising a casing structure, a hollow rotatable shaft journaled therein, a thermostatic coil having its inner end affixed to said shaft, its outer end being freely suspended within the casing and adapted for connection with the damper, a bolt threaded into one end of said shaft and forming the journal therefore, a washer attached to said bolt in frictional engagement with the casing thereby to maintain the free end of the thermostatic coil in a selected position, and an operating lever removably connected to the hollow shaft by means of said bolt, movement of said lever effecting a rotation of the shaft thereby to vary the position of the free end of the thermostatic coil to accord with said selected position.

3. In a thermostatic control device, a spiral shaped temperature responsive element having the outer end connected with the device to be controlled and the inner end portion thereof bent to form a substantially cylindrical loop, a shaft having a bore adapted to snugly receive said loop, a pin frictionally engaged with the inner surface of said loop to expand and lock the same to said shaft, and an adjusting lever connected to said shaft for varying the position of said temperature responsive element.

4. In a thermostatic control device, a spiral shaped temperature responsive element having the outer end connected with the device to be controlled and the inner end portion thereof bent to form a substantially cylindrical loop, a shaft having a bore adapted to snugly receive said loop, a pin frictionally engaged with the inner surface of said loop to expand and lock the same to said shaft, said pin being adapted to project from said bore and form a bearing for said shaft, and an adjusting lever connected to said shaft for varying the position of said temperature responsive element.

CHARLES D. MONTAGUE.